(12) United States Patent
Minix et al.

(10) Patent No.: US 6,270,137 B1
(45) Date of Patent: Aug. 7, 2001

(54) TRACK SYSTEM FOR CUSTOMIZED VEHICLES AND TRAILERS

(75) Inventors: Terrance E. Minix, Bristol; James G. Fisher, Elkhart, both of IN (US)

(73) Assignee: J.T. Custom Works Inc., Elkhart, IN (US)

( * ) Notice: Subject to any disclaimer, the term of this patent is extended or adjusted under 35 U.S.C. 154(b) by 0 days.

(21) Appl. No.: 09/517,964

(22) Filed: Mar. 3, 2000

(51) Int. Cl.⁷ ............................................. B60P 3/377
(52) U.S. Cl. .................. 296/24.1; 296/3; 312/246; 248/503; 410/105
(58) Field of Search ................. 296/3, 24.1, 156, 296/164; 312/246; 248/500, 503, 503.1; 410/8, 66, 67, 104, 105; 108/44, 48, 102, 137

(56) References Cited

U.S. PATENT DOCUMENTS

| | | | |
|---|---|---|---|
| 2,390,479 | * 12/1945 | Watson et al. ............... | 267/141.3 |
| 2,574,483 | * 11/1951 | Jack ................................ | 293/3 |
| 2,950,126 | * 8/1960 | Armentrout ..................... | 410/66 |
| 3,042,978 | * 7/1962 | Eames et al. .................... | 52/32 |
| 3,635,516 | * 1/1972 | Commans ........................ | 296/171 |
| 3,652,050 | * 3/1972 | Marrujo et al. ................. | 248/429 |
| 4,458,939 | * 7/1984 | Hohn ................................ | 296/164 |
| 4,850,769 | * 7/1989 | Matthews ........................ | 410/105 |
| 5,306,064 | * 4/1994 | Padovano et al. .............. | 296/24.1 |
| 5,662,373 | * 9/1997 | Hanemaayer .................... | 296/164 |
| 5,921,629 | * 7/1999 | Koch et al. ...................... | 297/344.1 |
| 6,145,910 | * 11/2000 | Baldas et al. ................... | 296/65.01 |

* cited by examiner

Primary Examiner—D. Glenn Dayoan
Assistant Examiner—Paul Chenevert
(74) Attorney, Agent, or Firm—Young & Basile, P.C.

(57) ABSTRACT

A conversion system for a vehicle or trailer especially for vans, having a track system comprising rails secured to the floor and sidewalls of the vehicle for customizing the vehicle with modular components which can be positioned and secured within the vehicle by fasteners that releasably secure the components to a portion of the track system. Each modular component has a corresponding track along at least one of the bottom or side of the modular component for matingly connecting to a portion of one of the rails.

10 Claims, 2 Drawing Sheets

TRACK SYSTEM FOR CUSTOMIZED VEHICLES AND TRAILERS

FIELD OF THE INVENTION

The invention is a track system installed within a vehicle for receiving releasably attachable modular component therein for customizing vehicles.

BACKGROUND OF THE INVENTION

Many people today lead busy lives where their time is strictly regulated between work, their children's activities, and other family responsibilities. As a result many people do not have or take the time for extended vacations. When time allows, most people escape for quick long weekend vacations. Many of these people take their mini-vacations with their family to a nearby park or campground. People in these situations may not want to invest in a vehicle used exclusively for recreational purposes, because the vehicle may stand idle during most of the year.

Typical recreational vehicles and especially conversion vans are customized with bedding and eating facilities to accommodate at least short camping trips. Unfortunately, typical conversions of vans which accommodate recreational features therein, include components which are fixed in place at a specific location and which cannot be easily removed by the owner. As a result, the conversion van or other converted vehicle is limited in its use, and does not allow the vehicle to be used for other purposes.

SUMMARY OF THE INVENTION

It is the desire of the present invention to provide a conversion system for a vehicle that addresses the aforementioned concerns. In particular, it is desirable to provide a conversion system that provides versatility for the vehicle. The present invention provides a conversion system for a vehicle for installing modular and changeable components in the vehicle. The conversion system comprises a track system located along at least one of the side walls or floor of the vehicle. Each modular component has at least a corresponding track or plate secured to the modular component and positioned on the modular component to matingly connect to a portion of the rail in the track system when installed in the vehicle. The conversion system further includes fastening means which releasably secures the track of the modular component to the rail of at least a portion of the track system.

In another aspect of the invention, the sidewalls and floor of the vehicle, the rail of the track system, and the track of the modular components will have a plurality of aligned apertures extending therethrough to allow a modular component to be releasably secured at incremental locations along the track system.

In another aspect of the invention, to provide added security of the modular component within the vehicle, a modular component may be integrally fitted with both a floor track and a sidewall track so that the modular component is releasably secured to the track system in both vertical and horizontal locations.

In a further aspect of the invention, the fastening means allows for easy removal and fastening of a modular unit to the track system by hand.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
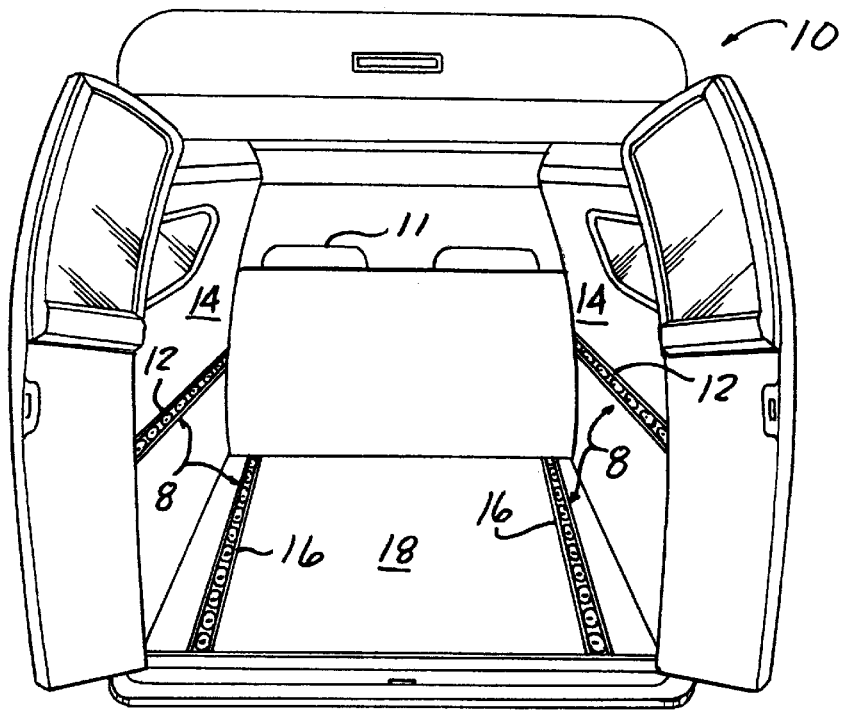
FIG. 1 is a perspective view of a rear of a vehicle such as a van showing a track system of the present invention.
Figure 2:
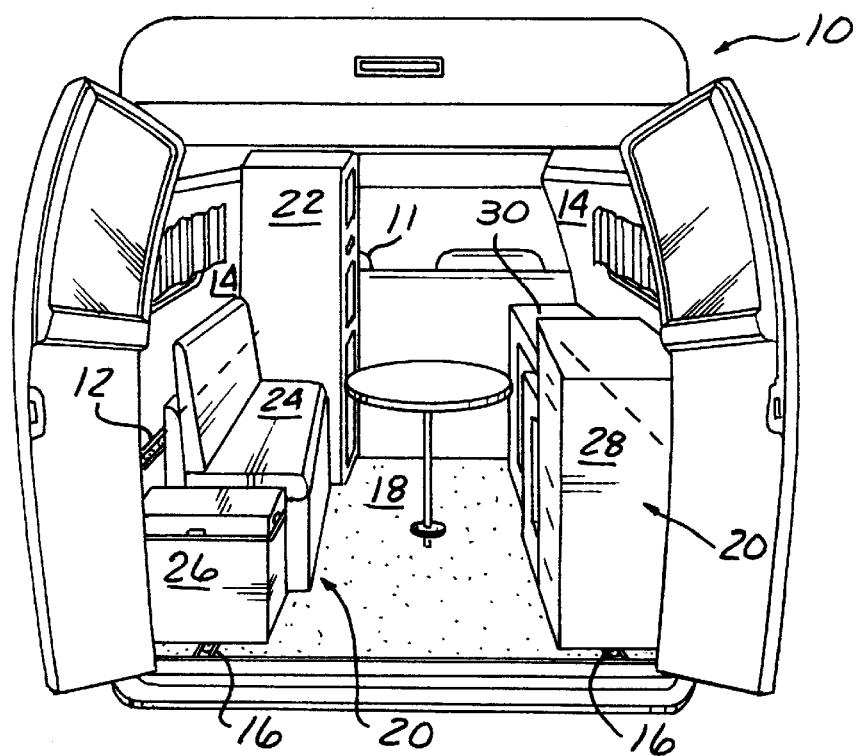
FIG. 2 is a perspective view of the rear of the vehicle as shown in FIG. 1 showing modular components secured within the vehicle along the track system.

Looking first at FIGS. 1 and 2, there is shown a modular and changeable conversion system for a vehicle 10, and especially for a vehicle such as a van/trailer etc. having an open area behind the driver's seat 11. The present invention includes a track system 8 installed in the open area of the vehicle. The track system includes a pair of rails 12 each fixedly secured to opposing sidewalls 14 of the vehicle 10 and a pair of rails 16 secured on the floor 18 of the vehicle 10. The sidewall rails 12 are preferably each positioned along the sidewalls 14 at the same height above the floor 18. The pair of rails 16 in the floor 18 are each positioned a predetermined distance from their adjacent sidewall 14. Maintaining the same height locations of the rails 12 along the two sidewalls and maintaining the same distance from the sidewalls 14 of each floor rail 16 allows a modular component 20 to be positioned along either sidewall 14 of the vehicle. Each of the rails 12 and 16 have a plurality of threaded through apertures 25. The rails 12 and 16 are secure to the respective sidewall 12 and floor 16 so that the through apertures 25 align with apertures 29 formed into the sidewalls 14 and floor 18 of the vehicle 10 (shown in FIG. 4). The apertures 29 in the sidewalls 14 and floor 18 are optional.

FIG. 2 shows only one typical configuration of modular components 20 installed within the vehicle 10 and secured to the vehicle 10 along the track system 8. The modular components 20 may include a wardrobe closet 22, a dinette seating apparatus 24 that can be converted into a bed, a portable toilet 26, a small refrigerator 28 and a sink 30. The modular components 20 may also comprise other items not shown in FIG. 2, such as a desk, bookcase, storage cupboards, and others. The track system 8 allows for a multiple number of conversion configurations within a vehicle 10 with just a small number of modular components. Each owner of a vehicle having a track system 8 can determine which modular components 20 are beneficial for his needs. Other modular components 20 may also be purchased later.

Figure 3:
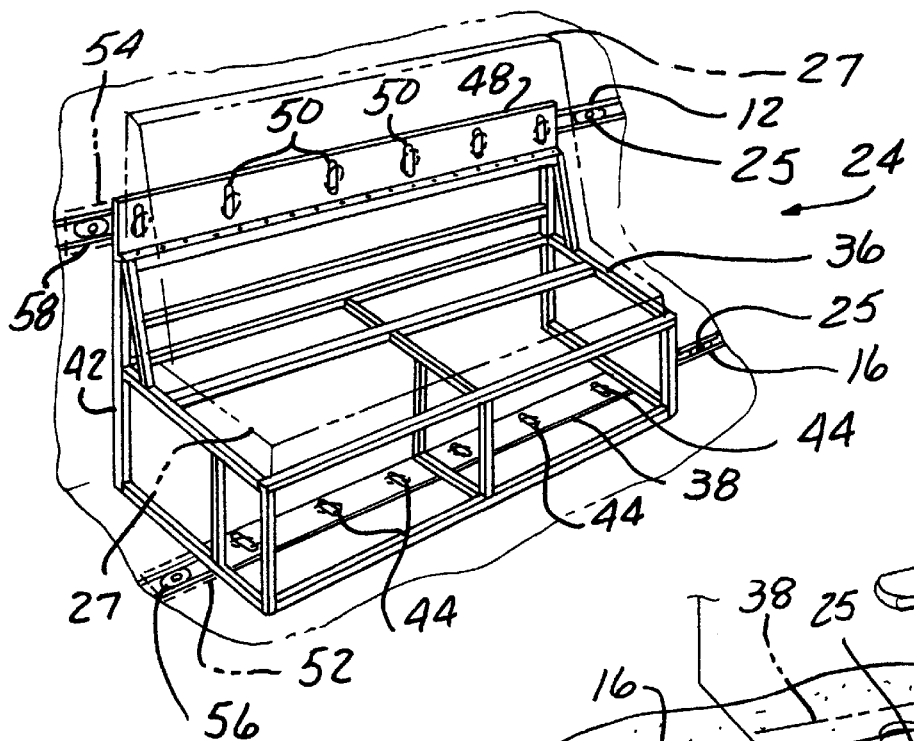
FIG. 3 is a perspective view of a frame of a dinette component showing a portion of the frame aligned with the track system for securing the dinette frame to the vehicle.
Figure 4:
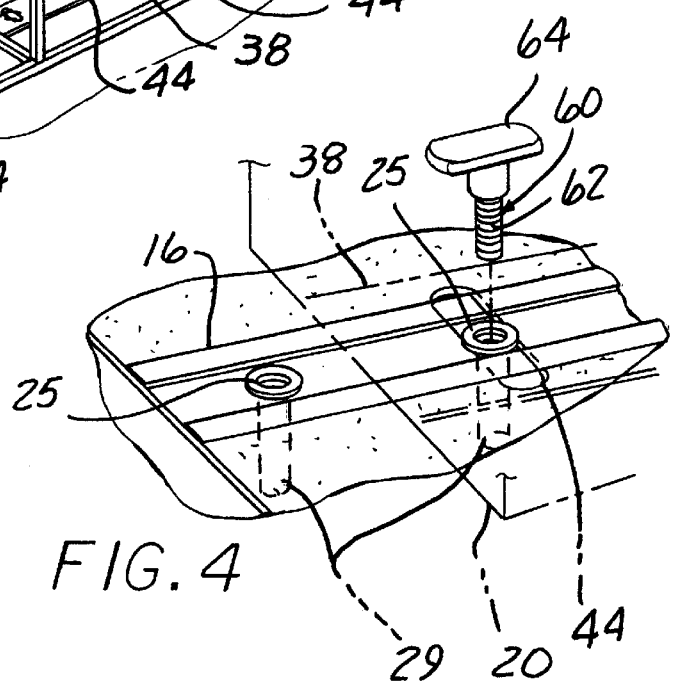
FIG. 4 is an exploded prospective view of a portion of the frame and track system.
Figure 5:
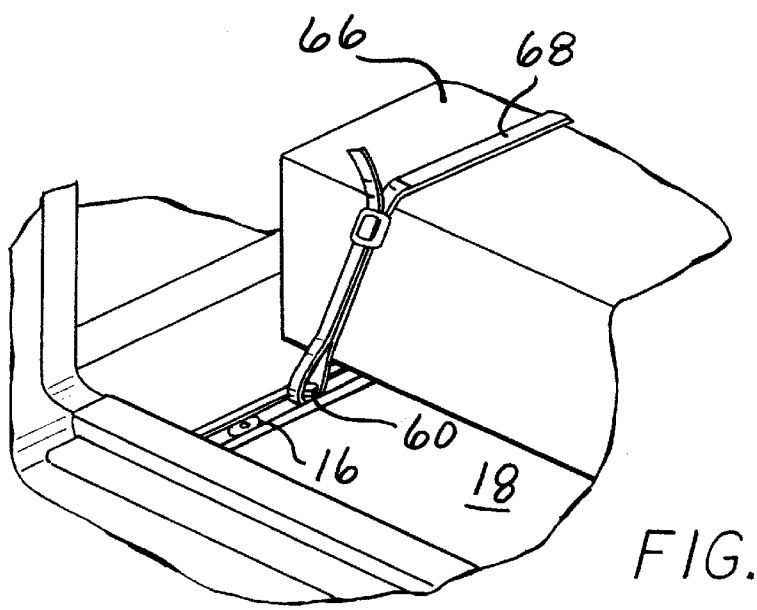
FIG. 5 is a perspective view showing a portion of the track system in the rear of the vehicle.

FIGS. 3 through 5 illustrate the track system 8 in more detail. FIG. 3 shows the dinette seating apparatus 24 to illustrate the track system 8 and the means for securing a modular component 20 as represented by the dinette seating apparatus 24 to the vehicle 10 using the track system 8. FIG. 3 shows the frame 36 for the dinette seating apparatus 24, and shows the padding 27 for the dinette seating apparatus 24 in phantom. The frame 36 for the dinette seating apparatus 24 includes a lower track 38 positioned along the base of the dinette seating apparatus 24 and spaced from the back 42 of the dinette seating apparatus 24 a predetermined distance to correspond with the location of the rail 16 located on the floor 18 of the vehicle 10. Therefore, when the lower track 38 is connected to one of the rails 16, the back 42 of the dinette seating apparatus 24 is positioned adjacent to sidewall 14. The lower track 38 of a modular component 20 includes a plurality of spaced apertures 44 therein. Apertures 44 are spaced a distance to correspond with the spacing of the apertures through rail 16.

Some modular components 20 having a height extending above a predetermined distance will also include a wall track 48 secured to a vertical portion of the modular component 20. As shown in FIG. 3 the dinette seating apparatus 24 includes the wall track 48 positioned on the frame 24 at a height to correspond with the sidewall rail 12, the wall track 48 may extend the entire length of the particular modular component 20 or may only extend a portion of the length of the modular component 20. The wall track 48 also includes a plurality of space apertures 50, which are spaced at a predetermined distance from each other to correspond with the apertures 25 located in the wall rail 12.

Although FIG. 3 shows one particular modular component 20 as a dinette seating apparatus 24 having both a lower track 38 and a wall track 48, other modular components 20 may only have one of the aforementioned tracks incorporated or secured within the framework of the modular component 20. Other modular components may have floor or wall plates 52 and 54 respectively, extending outwardly from the modular component 20. The plates 52 and 54 will also include at least one through aperture 56 and 58 respectively for aligning with an aperture 25 in the floor rail 16 or wall rail 12. The extending plates 52 and 54 are rigidly affixed to the modular component 20. The plates 52, 54 provide alignment and fastening locations for modular components 20 that do not have accessible internal tracks attached to the modular component 20. It is to be understood that the dinette seating apparatus 24 shown in FIG. 3 is just one example of a modular component 20 that incorporates the track system to provide releasable attachment means to at least one of the floor 18 or walls 14 of the vehicle 10.

The apertures 29 may be formed in the sidewall 14 and floor 18 at locations predetermined for placement of rails 12 and 16 for desired locations of the modular components. The rails 12 and 16 are fixedly secured to the sidewalls 14 and floor 16 so that apertures within the rails overlay the apertures 29 formed in the sidewalls 14 and floor 18 of the vehicle. The spacing of all the apertures are preferably kept uniform to be located at six to twelve inch increments. Generally the location of the rails 12 and 16 are the same from one vehicle to another vehicle 10. This allows for uniformity in the manufacture of the various modular components 20. In addition, the rails used as a sidewall rail 12 or a floor rail 16 are preferably identical to each other to maintain a minimum of inventory. The lengths of the rails 12, 16 may vary for a particular vehicle or application.

FIG. 4 shows an enlarged view of a portion of the track system 8 including the alignment means and fastening means for the installation of a modular component 20 into a vehicle 10. The modular component 20 is positioned on the floor 18 of the vehicle 10 or against one of the sidewalls 14 such that the apertures 44 or 50 in the tracks 38 or 48, or the apertures 56 or 58 in plates 52 or 54 are aligned with the respective apertures 25 in the rails. The modular component 20 is positioned along the rails 16 or 20 such that at least one of the apertures in the tracks or plates of the modular component 20 aligns with an aperture in the rail. Preferably, the spacing between apertures in the tracks or plates of the modular component 20 correspond to the spacing of the apertures 44, 50 in the rails of the vehicle 10. Therefore the modular component 20 may be secured to the vehicle 10 at more than one location.

A fastening means 60 may include a threaded screw having a threaded end 62 size to be threadably accommodated within the threaded aperture 25 of the rail 12, 16. At the other end of the screw 60 is preferably a knob 64 to allow for manual threading of the screw 60 into the apertures of the modular component 20 and the rails 12, 16 without the use of tools, such as a screwdriver. Therefore it is preferred that the fastening means can be threaded and un-threaded by means of a person's hand. FIG. 4 shows the fastening means for insertions within a floor track 38 and floor rail 16. It is to be understood that this is for example only and that the fastening means is also applicable for fastening a wall track 48 to a wall rail 12, or one of the plates 52 and 54 into the respective rails.

One of the advantages of using a track system 8 for securing modular components 20 within a vehicle 10 is that the track system 8 can be used for other purposes, such as an anchor to tie down other articles transported within the vehicle 10 when the vehicle 10 is not being used for recreation. For example, if the owner wishes to transport an item such as a motorcycle, lawnmower, or storage boxes 66, the fastening screws 60 can anchor a tie down strap 68 to a rail and onto or around the particular articles 66 to prevent movement of the article 66 during transport. During these occasions, either all or a portion of the modular components can be easily removed from the interior of the vehicle to allow the article 66 to be tied down and secured in place to prevent movement of the article while in transport.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A conversion system releasably securing modular components in a vehicle, the vehicle having a length extending from a front bumper to a rear bumper and having a pair of interior sidewalls and a floor therebetween and said vehicle having at least two through apertures in at least one of the sidewalls and the floor, said conversion system comprising:

a track system having at least one rail located along at least one of the floor and sidewall of the vehicle, said rail having at least two apertures positioned along said rail for alignment with the at least two through apertures in the at least one of the sidewalls and the floor;

each modular component having at least one track secured to the modular component and said track having at least one aperture therethrough positioned to matingly align to an aperture on the rail and an aperture in the at least one of the sidewalls and the floor; and fastening means for disposition in the aligned apertures in the rail, track, and at least one of the sidewalls and the floor for releasably securing the track of the modular component to the rail and to at least one of the floor and sidewalls.

2. The conversion system of claim 1, wherein the rail located on the floor extends continuously along a portion of the length of the vehicle and is spaced from at least one of the sidewalls by a predetermined distance.

3. The conversion system of claim 2 wherein a first floor rail is secured on the floor and spaced from one of the interior sidewalls a predetermined distance and a second floor rail is secured on the floor and spaced from an opposing interior sidewall.

4. The conversion system of claim 1, wherein said fastening means is a threaded screw and at least one of the apertures in the sidewall, floor and track of the modular component is threaded for receiving the threaded screw.

5. The conversion system of claim 4, wherein the rail has a plurality of threaded apertures extending therethrough, wherein said plurality of threaded apertures are evenly spaced along the rail approximately six to twelve inches.

6. A conversion system for releasably securing modular furniture into a vehicle having an interior floor and sidewalls, said conversion system comprising:

a track system with at least one rail connected to at least one of the interior floor and sidewalls, said rail having at least two apertures therethrough;

the modular furniture having at least one track portion secured thereon, said track portion having through apertures positioned on the at least one track portion for aligning with the at least two apertures through the rail, wherein at least one of the apertures in the rail and in the track portion is threaded; and a threaded screw for disposition in the aligned apertures in the track portion and the rail for releasably securing the modular furniture to the rail.

7. The conversion system of claim 6, wherein said rail has a plurality of apertures therethrough.

8. The conversion system of claim 7, further comprising means for fixedly securing said rail to the interior of the vehicle.

9. The conversion system of claim 7, wherein the apertures in the rail are evenly spaced.

10. The conversion system of claim 9, wherein the through apertures in the track portion secured to the modular furniture are evenly spaced and positioned to align with the apertures in the rail.

* * * * *